(12) United States Patent
Samii et al.

(10) Patent No.: US 6,372,379 B1
(45) Date of Patent: Apr. 16, 2002

(54) MICROPOROUS MEMBRANE BATTERY SEPARATOR FOR SILVER ZINC BATTERIES

(76) Inventors: Abbas M. Samii, 25 Hurley St., Belmont, MA (US) 02478; Garrin Samii, 25721 Califia Dr., Laguna Hills, CA (US) 92653

( * ) Notice: Subject to any disclaimer, the term of this patent is extended or adjusted under 35 U.S.C. 154(b) by 0 days.

(21) Appl. No.: 09/512,917

(22) Filed: Feb. 25, 2000

(51) Int. Cl.$^7$ ................................................. H01M 2/14
(52) U.S. Cl. ....................................... 429/145; 429/129
(58) Field of Search ................................. 429/129, 131, 429/136, 145

(56) References Cited

U.S. PATENT DOCUMENTS

| | | | | |
|---|---|---|---|---|
| 4,650,730 A | * | 3/1987 | Lundquist et al. ............. | 429/62 |
| 4,699,857 A | * | 10/1987 | Giovannoni et al. ........ | 429/204 |
| 5,126,219 A | * | 6/1992 | Howard et al. .............. | 429/252 |
| 5,336,573 A | * | 8/1994 | Zuckerbrod et al. ........ | 429/252 |
| 5,641,565 A | * | 6/1997 | Sogo ....................... | 428/315.7 |
| 6,124,059 A | * | 9/2000 | Bohnstedt et al. ........... | 429/252 |
| 6,242,127 B1 | * | 6/2001 | Paik et al. .................. | 429/145 |

* cited by examiner

*Primary Examiner*—Gabrielle Brouillette
*Assistant Examiner*—M. Wills
(74) *Attorney, Agent, or Firm*—Mark P. White

(57) ABSTRACT

A separator membrane for use in silver-zinc batteries is produced by extruding a blend of two fillers with the same chemical formula but different particle size. A polyolefine polymer and a plasticizer are blended and extruded to form a thin sheet of 1 to 10 mil thickness. The plasticizer is then extracted to leave submicron voids in the membrane. Plasticizers are added as processing aids, and can be either soluble or insoluble in water, and include petroleum oils, lubricating oils, fuel oils, and natural oils such as tall oils and linseed oils. The oil are then extracted from the membrane by conventional procedures such as single stage extraction using a suitable solvent. Commercially available wetting agents known to the art such as dodecylphenoxy polyethoxy ethanol and isooctyl phenyl polyethoxy ethanol are coated onto the sheet to improve wettability. The sheet is then dried, and boiled in distilled water for one minute or more, before being finally dried.

24 Claims, 3 Drawing Sheets

MICROPOROUS MEMBRANE BATTERY SEPARATOR FOR SILVER ZINC BATTERIES

BACKGROUND OF THE INVENTION

1. Field of the Invention

The present invention relates to separators for use in silver-zinc batteries, and more particularly to separators made of micro-porous membranes.

2. Description Relative to the Prior Art

Silver zinc batteries have the highest power among the alkaline batteries. They are composed of at least one pair of electrodes of opposite polarity, usually a series of adjacent electrodes of alternating polarity, positive silver electrode and a negative zinc electrode, and KOH as electrolyte. Separators are positioned in the cell between the adjacent electrodes to prevent shorting between electrodes from metal migration. The inclusion of these separators is well known in battery technology, and has been the subject of a number of patents. The separators are porous, allowing the migration of electrolyte through the separator, but preventing migration of metal particles.

Silver zinc batteries have an energy density per volume 2.5 times greeter than those of lead acid batteries and 1.8 times higher than those of nickel cadmium. The energy density per weight of a silver zinc battery is 3.7 times higher than a lead acid battery and 2.0 times higher than a nickel cadmium battery. In addition there are less environmental concerns with silver zinc batteries than with lead acid or nickel cadmium and silver-zinc batteries are safer than lithium batteries.

However, silver zinc batteries have significantly shorter cycle life than the other batteries. They have a high capacity loss and short cycle life and higher labor assembly costs than other batteries. As a result, silver zinc batteries have, up to now, been limited in their applications to those areas where high power is required, such as the military.

Cellophane is the primary choice for separators in the vast majority of both military and commercial secondary silver zinc batteries. It has been found, however, that the Cellophane separator is the primary cause of the short comings of silver zinc batteries. This Cellophane separator has been the major obstacle for producing an enhanced silver zinc battery with cycle life, calendar life and performance comparable to alkaline batteries.

In prior art silver zinc cells, either the positive or the negative electrode is commonly wrapped with 5 to 8 layers of Cellophane. An electrolyte absorbing layer is usually positioned between the separator and the electrode. Pellon (nylon) or a surface treated non-woven polyolefine mat is usually used as absorbing layer in silver battery systems.

In prior art the Cellophane acts as a "sacrificing" layer between the electrodes of silver zinc batteries. In effect, the Cellophane layer is progressively consumed as it performs its function. Cellophane is not stable in KOH or silver oxide, a powerful oxidizing agent present in silver battery systems, which attacks and oxidizes the Cellophane. Water also attacks Cellophane and makes it swell. In order to reduce the Cellophane degradation in a KOH solution a higher concentration must be used, 45% KOH is common. In a low KOH concentration (i.e., high water content) Cellophane swells and degrades rapidly. At room temperature, the electrical resistance of a 45% KOH solution is significantly higher than a 31% KOH solution. The performance of a battery with 45% KOH is, therefore, poorer than a battery that uses 31 % KOH solution as electrolyte, assuming all other parameters stay the same.

Thus, the cycle life and calendar life of today's silver zinc battery is very short due to usage of Cellophane as the main separator. The cycle life of a silver zinc battery is primarily limited to the number of sacrificing Cellophane layers used in a given cell. However, this number is limited to eight layers because Cellophane does not increase cycle life if more than eight layers are added. Eight layers of Cellophane can only withstand a maximum wet life of 2–3 years in a 45% KOH solution and designing a cell with more Cellophane layers will not increase the calendar life and it will only reduce the energy density. The calendar life of a cell using Cellophane is even shorter in a 31% KOH solution.

Celgard®[1] is used as an alternative to Cellophane as a separator for some alkaline battery applications. Celgard is a polyolefine membrane produced by sheet extrusion and gradual stretching of the sheet to produce a porous membrane. The pore diameters of Celgard are large, 1000–2000 angstrom range, (U.S. Pat. Nos. # 3,558,764 and # 5,667,911 ) and not uniform, the pore diameters in machine direction are significantly larger than cross machine direction. Although the application of Celgard is described in the prior art, Celgard is not suitable for silver zinc battery application due to its large pore size and low pore tortuosity. The cycle life of a silver zinc battery with Celgard separator is significantly shorter than the one with Cellophane. This is due to a larger pore diameter and faster rate of colloidal silver migration through the pores causing a very short cycle life, therefore, Celgard is not used for any commercially available silver zinc batteries.

The silver zinc battery separator is an insulator which must be resistant to degradation in strong alkali (such as potassium hydroxide) and heat. Further, the separator must be highly porous to allow migration of electrolyte and to provide a battery of high energy density. Another criterion is that the separator must exhibit low electrical resistance. A still further criterion is that a separator must inhibit migration of metal particles in electrolyte solution. In addition, the separator must be capable of inhibiting formation and growth of dendrites which can bridge the thickness of the separator after a period of time and cause shorting between electrodes of different polarity.

One of the other problems associated with silver zinc secondary batteries is capacity loss after each cycling which is due to a phenomena called zinc shape change. During each charge and discharge zinc oxide dissolves in electrolyte and re-plates back on the electrode. However, the zinc oxide does not re-plate necessarily at the same location. Zinc oxide usually dissolves from the top of the negative electrode and re-plates on the bottom, reducing the surface of active material. This phenomena will manifest itself by a gradual capacity loss.

Various prior art has attempted to remedy these problems. U.S. Pat. No. 5,336,573 discloses a method of making battery separators with high tensile strength by utilizing prior art technology for producing microporous membranes (extruding a mixture comprised of polymer, particulate filler and processing plasticizer to form a sheet, then calendar the sheet and extract the plasticizer in another step). instead of using a sheet die, they used a cross-head die and encapsulated a non-woven substrate inside two layers of microporous sheets. In a cross-head die, the processing mixture makes a 90 degree turn and splits to provide two feeds (one upper and one lower). At the same time, the fibrous sheet (non-woven) is fed into the die through a separate mandrel and is positioned between two feeds within the die. The two extruded feeds and the fibrous sheet meet close to the die's exit. In this region the mixture from the feeds recombines while encapsulating the fibrous sheet within its core. The main objective of U.S. Pat. No. 5,336, 573 is to produce a microporous sheet with a very high tensile strength.

The separator produced, using the method of this patent had large pores, due to the use of the non-woven, macroporous web encapsulated with a microporous membrane, since the pore diameter is a function of the fiber diameter which is usually in the range of 5 microns. Therefore, the separator described here cannot be used to minimize silver migration.

In U.S. Pat. No. 4,371,596 Sheibley describes producing a flexible porous battery separator for an alkaline cell by coating a woven or non-woven substrate with a slurry comprised of a copolymer or rubber-based resin (a binder), a polar organic plasticizer (must react with the alkaline electrolyte), an organic solvent and two or more inorganic or organic fillers with distinct particle sizes As the coating dries, each particle is coated with a thickness of plasticizer with the smaller particles filling the voids between the larger particles. The polar plasticizer preferentially deposits on and coats the surface of the polar filler materials within the substrate matrix' thus, uniform pores are obtained when the plasticizer reacts with electrolyte. The pore size depends upon the thickness or width of the pathway, which in turns depends upon surface area of the fillers and the amount of the plasticizer.

Shiebly uses a blend of filler to make a coating solution to fill the large pores of the non-woven material. This product is not extruded, unlike the present invention. In the present invention, the filler is used to generate fine interconnecting pores. In the present invention, the polymer is used as a binder to attach the filler particles.

The prior art described by Sheibly disclose neither information regarding the average pore diameter of the resulting separator, nor information regarding the degree of improvement of the extended Ag—Zn battery life. The pore diameter of the above invention not only depends on surface area of the filler as described but the average pore diameter also depends on fiber diameter of the woven and non-woven substrates used in the invention.

The main objective of the U.S. Pat. No. 4,371,596 is to reduce the very large pore size of a non-woven substrate and create a microporous membrane by a coating method. The pore diameters created by this method have not been disclosed and cannot be evaluated for colloidal silver migration in a silver zinc cell.

The U.S. Pat. No. 4,287,276 by Lundquist discloses a method for reducing the electrical resistant and improving dendrite resistance for alkaline battery separator by using high surface area filler. By using high surface area filler, the percent porosity of the separator is increased which results in a separator with high ion conductivity and low electrical resistance. In order to improve dendrite resistance of the alkaline battery separator.

The Lundquist patent, using high surface area filler, does not significantly reduce the pore diameter of the separator to minimize colloidal silver migration. Using high surface area filler, as described in Lundquist, does not significantly improve the cycle life of a silver zinc cell.

In order to significantly minimize colloidal silver migration, the pore diameter of the sheet has to be reduced to less than 0.005 microns.

The reduction of pore diameter to less than 0.005 cannot be achieved by using a blend of high-surface-area filler alone. It can not even be achieved by using a blend of fillers in which one of the fillers has an average pore diameter in the range of; 0.03 microns as used in the present invention. In order to produce a sheet of smaller than 0.005 micron pores, the sheet has to be further processed by the boiling step, as described in the current invention.

Lundquist added carbon black to the separator formed from polyolefin, a plasticizer and a filler with very large surface area of from 100 to 385 m2/ee and a pore volume of at least 0.0.075 cc/gm.

The average pore diameter created described in U.S. Pat. No. 4,287,278 is in the range of 0.05 to 0.10 microns and membranes produced by this method do not significantly delay the colloidal silver migration in a silver zinc cell.

U.S. Pat. No. 5,948,557 describes microporous material in the form of a thin sheet or tube having a thickness across the microporous material in the range of from 5 to 26 micrometers. The process for producing such microporous material is well known in prior art (briefly, extruding a mixture comprised of polymer particulate filler and a processing plasticizer to form a sheet), but, instead of using a sheet die and sending it through a calendar stack they have used a blown film die and its down stream.

The main objective of U.S. Pat. No. 5,948,557 is to produce an extremely thin microporous membrane.

The current invention discloses a method of making microporous membranes with the average pore diameter in the range of 0.004 microns. This is the pore diameter that significantly delays the colloidal silver migration (delaying a short circuit in a silver zinc cell and extending the cell life). The smallest pore diameter that can be produced by the methods mentioned in the above prior art patents is at least one order of magnitude larger than the current invention.

In the current invention two criteria are used to reduce the average pore diameter. The first criteria is related to the particle size of two fillers and their ratio of the mix. The second and the most important criteria uses a phenomenon that creates a physical shrinkage of the matrix forming extremely small pore diameters. In this method, after the sheet is extruded and all of the plasticizer is extracted, the web is coated with a wetting agent and then dried. In the next step, the web is submerged in a tank of boiling water for one minute and then dried with air at room temperature overnight. The membrane shrunk between 10–20% in MD (machine direction) and the resultant membrane has an average pore diameter of 0.004 microns. The average pore diameter prior to the boiling step was measured and was 0.07 microns. The result indicates that the hydrophilic wetting agent which coats the membrane to will cause the shrinkage of the membrane matrix when water and heat are present. This shrinkage will result in significant reduction in membrane's average pore diameter which is required to minimize colloidal silver migration. This result shows that producing pore diameter smaller than 0.01 micron can not be achieved by just using fillers with high surface area and additional shrinkage of the membrane is required to obtain pore size smaller than 0.01 micron. The shrinkage of the membranes does not occur when the wet-coated membrane is annealed, or exposed to hot air. Boiling water has to be present to shrink the membrane.

The present invention combats zinc shape change by its ability to be enveloped tightly around the electrodes. Because of the separator's ability to be sealed tightly around the electrode the zinc oxide is not able to travel freely around the electrode and deposit in a different place than it was initially dissolved.

The present invention also provides a method for producing a battery separator which provides the micro-porosity of Cellophane, but which does not degrade in the alkaline electrolyte, as does Cellophane. The present invention is directed to a battery separator that has incorporated a blend of two $TiO_2$ fillers where the particle size of the one filler is ten times smaller than the other filler to produce a membrane with pores small enough to minimize colloidal silver migration in a silver zinc cell or in a silver battery system.

This invention makes it possible to substantially improve cycle life, calendar life and performance of silver zinc batteries. It also reduces the assembly costs. In addition, the separator of the current invention reduces the assembly cost and opens new market opportunities for the silver battery systems. The sealability and envelopability of this separator make it suitable for manufacture by high speed enveloping machines. Therefore, if used as a separator, it will significantly reduce the silver zinc and other alkaline battery manufacturing costs

SUMMARY OF THE INVENTION,

A general object of the current invention is to provide a battery separator for silver-zinc batteries with improved cycle life, calendar life, and performance.

A specific object of the current invention is to provide such a separator in the form of a microporous membrane with a controlled pore diameter.

A further specific object of this invention is to provide a microporous battery separator stable in KOH with a narrow range of pore size distribution and with an average pore diameter in a range of 0.1 to 0.01 microns.

A still further specific object of this invention is to provide a battery separator stable in KOH which significantly delays colloidal silver migration in batteries with positive silver electrodes.

A yet further specific object of this invention is to introduce a method for enveloping silver zinc battery electrodes in a sealable separator.

A final specific object of this invention is to produce a gas permeable microporous membrane for micro filtration and size exclusion.

According to one aspect of the invention, a method of creating a micro-porous membrane battery separator for silver zinc batteries includes combining two fillers with the same chemical formula but different particle size, blending a polyolefine polymer and a plasticizer, adding the blended polymer and plasticizer to the fillers to form a compound, and extruding the compound to form a thin sheet. The plasticizer is then extracted, and the process finishes with the coating of the extracted sheet with a wetting agent, then drying the coated sheet, and, finally, the immersing the coated sheet at least for 1 minute in boiling water, followed by air drying.

According to a second aspect of the invention, the wetting agent is selected from the group consisting of Dodecylphenoxy polyethoxy ethanol, and looctyl phenyl polyethoxy ethanol.

According to a third aspect of the invention the thickness of the sheet is between 3 and 10 mils.

According to a fourth aspect of the invention the fillers further comprise titanium dioxide.

According to a fifth aspect of the invention the polyolefine has a molecular weight of at least 3,000,000.

According to yet another aspect of the invention the polyolefine is a blend of between 90 and 95 percent by weight of ultra high molecular weight polyethylene, and between 5 and 10 percent by weight of high density polyethylene.

According to still another aspect of the invention the polyolefine is a blend of between 10 and 30 percent by weight of polypropylene, and between 70 and 90 percent by weight of ultra high molecular weight polyethylene.

According to yet one more aspect of the invention one of the fillers is a pigment grade titanium dioxide Rutile of 0.18 micron particle diameter and the other filler is an ultra fine UV grade titanium dioxide Rutile filler of 0.017 micron particle diameter.

According to still another aspect of the invention the plasticizer is selected from the group consisting of petroleum oils, lubricating oil, fuel oil, tall oil, and linseed oils.

According to a final aspect of the invention a wetting agent is used for coating after extraction of plasticizer.

BRIEF DESCRIPTION OF THE DRAWINGS

These, and further features of the invention, may be better understood with reference to the accompanying specification and drawings depicting the preferred embodiment, in which.

DETAILED DESCRIPTION OF THE PREFERRED EMBODIMENTS

Figure 1:
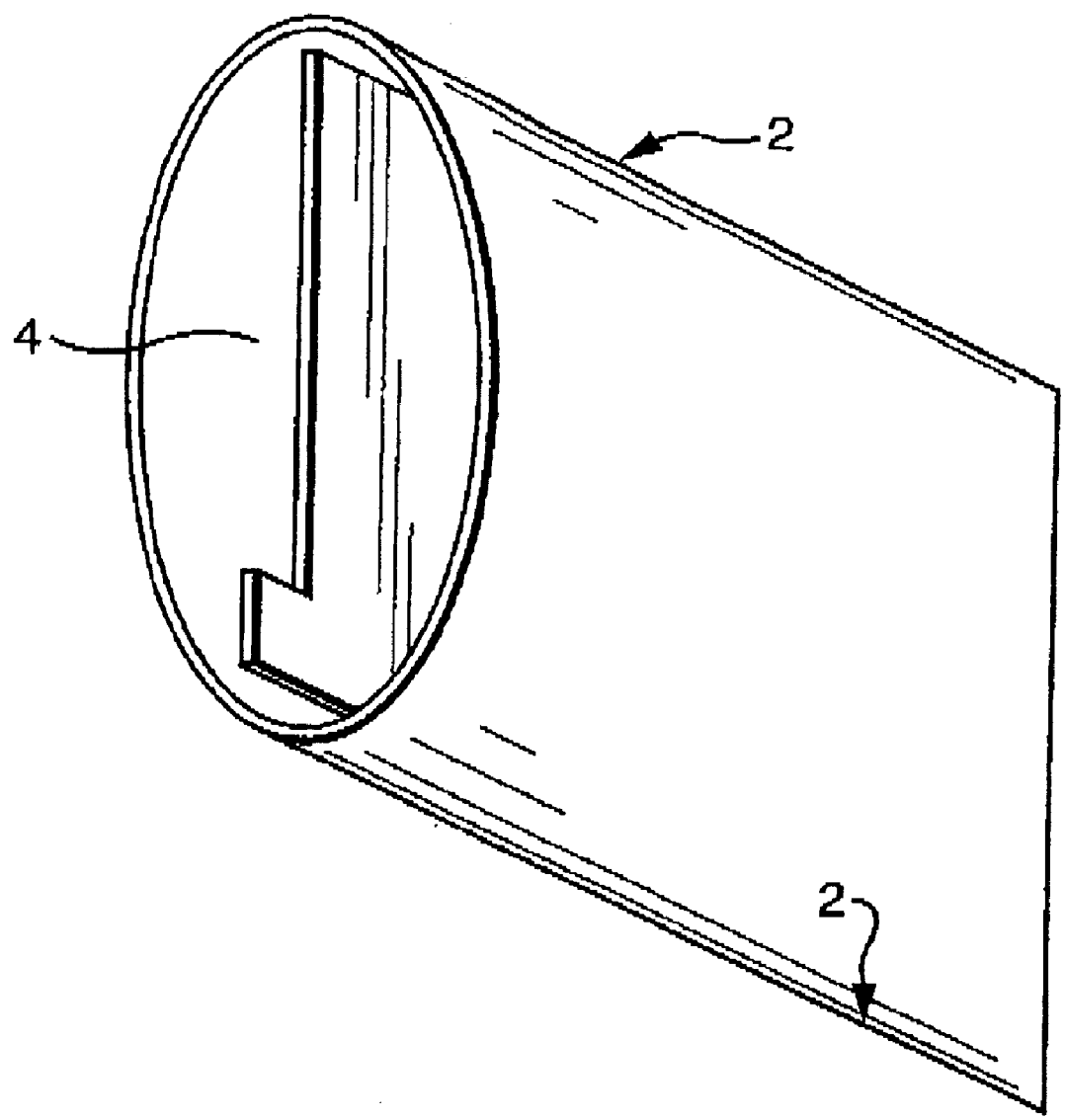
FIG. 1 depicts the completed membrane-electrode assembly (Prior Art).
Figure 2:
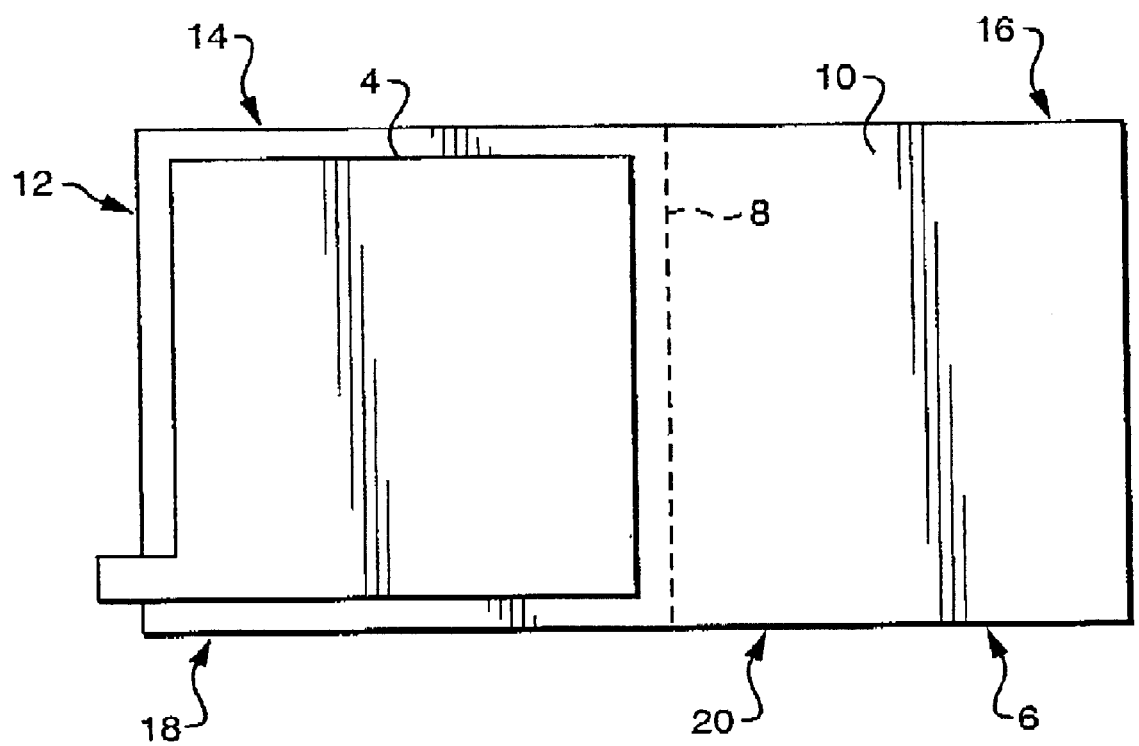
FIG. 2 depicts the membrane-electrode assembly during the manufacturing process (prior art).

The current invention describes a microporous membrane, and method of production of this membrane, having pore diameters of approximately 0.004 microns to delay, minimize, and inhibit colloidal silver migration and thus, improve cycle life, calendar life and performance of a silver zinc cell.

Colloidal particles within the silver-zinc battery electrolyte are in the range of 0.1 to 0.001 microns. Only those membranes having pore diameters smaller than 0.1 microns can reduce or stop migration of colloidal particles. Besides pore diameter, the pore tortuosity and pore size distribution plays a major role delaying the colloidal silver migration. Having a membrane with an average pore diameter smaller than 0.1 micron meter and high tortuosity delays the colloidal silver migration. In order to further delay or stop the colloidal silver migration, the pore diameter must be reduced to less than 0.01 micron.

The membrane of a given pore size range is produced by extruding a blend of two fillers with the same chemical formula but different particle size. A polyolefine polymer and a plasticizer are blended and extruded to form a thin sheet of 3 to 10 mil thickness. The plasticizer is then extracted to leave submicron voids in the membrane.

The polyolefine, preferably polyethylene of ultra high molecular weight with molecular weight of at least 3,000,000 or powder form polypropylene, or a blend of ultra high molecular weight polyethylene 90–95 weight % and 5–10 weight % high density polyethylene or a blend of 10 to 30 weight % polypropylene with 70–90% ultra high molecular weight polyethylene can be used to produce the membrane of current invention.

One of the fillers is a pigment grade titanium dioxide Rutile of 0.18 micron particle diameter and the other filler is an ultra fine UV grade titanium dioxide Rutile filler of 0.017 micron particle diameter. The fillers are blended with different ratios to produce membranes of different average pore diameter. Increasing the ratio of ultra fine UV grade titanium dioxide to pigment grade will lower the average pore diameter.

The suitable processing aids are plasticizers. The processing aid can be soluble or insoluble in water. Preferred are water-insoluble processing aids such as hydrocarbon materials including petroleum oils, lubricating oils, fuel oils, and natural oils such as tall oils and linseed oils. Preferred processing aids have solubility parameters close to that of polymer, preferably in the range of from 7.3 to about 8.4. The processing oil can be extracted from the sheet product (membrane) by conventional procedures, such as single stage extraction using a suitable solvent.

Commercially available wetting agents known to the art such as dodecylphenoxy polyethoxy ethanol and isooctyl phenyl polyethoxy ethanol are used to polarize the web's matrix structure, and to improve wettability.

The final step in the fabrication process involves boiling the web to further reduce the pore size. It has been found that the optimum way to accomplish this final step is to submerge the web in a tank of distilled, boiling water for a period of one minute. The web is then removed, and then dried in various ways, as indicated below.

EXAMPLE 1

Figure 3:
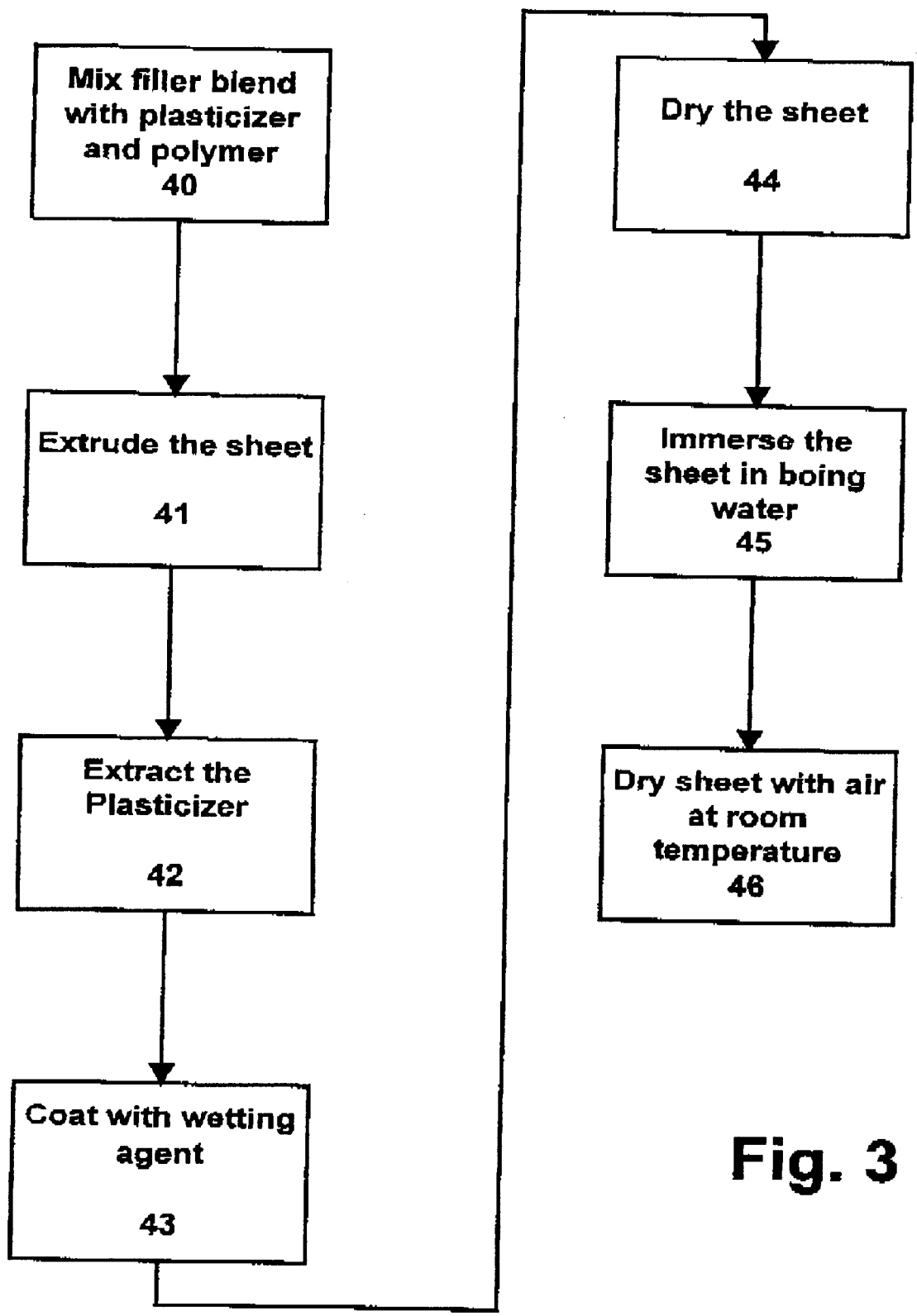
FIG. 3 depicts the process of the preferred embodiment in flow chart form.

The process of this example is shown in FIG. 3 in flow chart form. 2 parts of ultra fine titanium dioxide of 0.017 particle size was blended with 98 parts of pigment grade titanium dioxide of 0.17 particle size in a Univex mixer for 15 minutes Then, 19.0 pounds of the filler blend was mixed with 1.0 pound of UHMW polyethylene with molecular weight higher than 3 million and with 8 pounds of processing oil 40. The resulting dryblend was transferred to a hopper for extrusion. The sheet was extruded 41, and the extruded sheet was extracted completely with hexane to achieve a porosity of 50% 42 and coated with a solution of wetting agent 43 consisting of dodecylphenoxy polyethoxy ethanol. The sheet was dried 44, and then immersed in boiling water 45 for about a minute. Finally, the sheets was air dried at room temperature 46. The resulting microporous membrane consists approximately of 5% polymer and 95% filler. The resulting membrane had an average pore diameter of 0.077 microns. The average pore diameter was measured using mercury porosimetry analysis.

EXAMPLE 2

A blend of 5 parts of ultra fine titanium dioxide and 95 parts of pigment grade titanium dioxide was prepared for extrusion. 19.0 pounds of filler blend was mixed with 1.0 pound of UHMW polyethylene with molecular weight minimum 3 million and with 8 pounds of processing oil. The resulting dryblends was transferred to a hopper for extrusion. The extruded sheet of each filler blend was extracted completely with hexane and coated with an aqueous solution of wetting agent consisting of dodecylphenoxy polyethoxy ethanol. The resulting microporous membrane consists approximately of 5% polymer and 95% filler. The resulting membrane had an average pore diameter of 0.06 microns.

EXAMPLE 3

The coated membrane produced in example 1 was immersed in boiling water or 1 minute and then dried at room temperature. The membrane shrunk 10–20% in MD (machine direction).

EXAMPLE 4

The coated membrane produced in example 2 was immersed in boiling water for 1 minute and then dried at room temperature. The membrane shrunk 10–20% in MD (machine direction).

EXAMPLE 5

The membrane produced in examples 1 and 2 were dried for 10 minutes with hot air. Neither of the membranes shrank at all and there was no decrease in average pore diameter of either of the membranes as it was observed in examples 3 and 4.

EXAMPLE 6

The membrane produced in Example 1 was used in 12 AH silver zinc cells. A standard prior art silver zinc cell uses 5 wraps of one mil thick cellophane as the main a separator. Cellophane swells to almost three times its thickness in 45% KOH solution. 5 wraps of Cellophane in KOH has a thickness of approximately 15 mils. There, 2 wraps of 7.5 mils thickness produced in Example 1 replaced 5 wraps of cellophane in the cell. The membrane of the current invention does not swell in KOH.

EXAMPLE 7

The cycle life test in 12 AH silver zinc cells described in Example 6 above was repeated by using the pre-shrunk membrane produced in Example 3. The cycle life of the pre-shrunk separator produced in Example 3 was significantly better than the one with Cellophane and 50% better than the one produced in Example 1. The capacity loss of two wraps of the membrane of the current invention produced in Example 3 was also significantly better than the one with 5 wraps of Cellophane and the one with two wraps of the membrane produced in Example 1.

Table I below illustrates this improvement.

TABLE I

|  | Average Pore diameter | % Cycle life improvements |
| --- | --- | --- |
| Example 1 | .07 microns | 200 |
| Example 2 | .06 microns | 190 |
| Example 3 | .004 microns | 400 |
| Example 4 | .004 microns | 400 |
| Example 5 | .07 microns | not tested |
| Example 6 | .06 microns | not tested |

This table shows that there are significant cycle life improvements between separators made with the current invention and cellophenic separators. In addition, separators made with the process defined in examples 3 and 4 have less than one order of magnitude smaller pore diameters than separators made without the additional shrinkage step in boiling water. They have also shown significantly higher cycle life improvements.

FIG. 3 depicts the assembly before completion. The electrode 4 is placed on a sheet of the membrane material 6, which contains a left side 12 and a right side 10, and which has top edges 14 and 16, and bottom edges 18 and 20. The material further contains a crease 8. The right side 10 is folded along crease 8 and positioned parallel to left side 12, enclosing electrode 4. Top edge 14 is then sealed to top edge 16, and bottom edge 18 is likewise sealed to bottom edge 20.

Using the proposed configuration will reduce assembly costs and decrease the zinc electrode shape change since the pocket formed around the zinc electrode will force the containment of zinc oxide within the envelope during cell cycling. This configuration can be adapted for all flexible and sealable separators used in alkaline batteries.

While the invention has been described with reference to specific embodiments, it will be apparent that improvements and modifications may be made within the purview of the invention without departing from the scope of the invention defined in the appended claims.

We claim:

1. A method of creating a micro-porous membrane battery separator for silver zinc batteries comprising:
   combining two fillers with the same chemical formula but different particle size;
   blending a polyolefin polymer and a plasticizer;
   adding the blended polymer and plasticizer to the fillers to form a compound;
   extruding the compound to form a thin sheet;
   extracting the plasticizer;
   coating the extracted sheet with a wetting agent,
   drying the coated sheet;
   immersing the coated sheet at least for 1 minute in boiling water to reduce the size of micro-pores in the sheet; and
   drying the sheet at room temperature.

2. The method of claim 1, wherein the wetting agent is selected from the group consisting of:
   Dodecylphenoxy polyethoxy ethanol; and
   Isooctyl phenyl polyethoxy ethanol.

3. The method of claim 2, wherein the wetting agent is selected from the group consisting of:
   dodecylphenoxy polyethoxy ethanol; and
   isooctyl phenyl polyethoxy ethanol.

4. The method of claim 1, wherein the fillers further comprise titanium dioxide.

5. The method of claim 4, wherein the polyolefine has a molecular weight of at least 3,000,000.

6. The method of claim 5, wherein the polyolefin comprises a blend of between 90 and 95 percent by weight of ultra high molecular weight polyethylene; and
   between 5 and 10 percent by weight of high density polyethylene.

7. The method of claim 5, wherein the polyolefin comprises a blend of:
   between 10 and 30 percent by weight of polypropylene; and
   between 70 and 90 percent by weight of ultra high molecular weight polyethylene.

8. The method of claims 5, 6, or 7, wherein the first of the two fillers is a pigment grade titanium dioxide Rutile of 0.18 micron particle diameter and the second of the two fillers is an ultra fine UV grade titanium dioxide Rutile filler of 0.017 micron particle diameter.

9. The method of claimed 8, wherein the plasticizer is selected from the group consisting of:
   petroleum oils;
   lubricating oil;
   fuel oil;
   tall oil; and
   linseed oils.

10. The method of claim 8, wherein the plasticizer and polymer both have solubility parameters between 7.3 and 8.4.

11. A battery separator made in accordance with claim 8, in which the average pore diameter is substantially less than 0.004 microns.

12. The method of claim 8, wherein the ratio by weight of the first filler to the second filler is 98 to 2.

13. The method of claim 12, wherein the two comprise a filler blend, and wherein ratio by weight of the filler blend to the polyolefin is 19 to 1, and wherein the ratio by weight of the plasticizer to the sum of the filler blend plus the polyolefin is 8 to 20.

14. The method of claim 8, wherein the ratio by weight of the first filler to the second filler is 95 to 5.

15. The method of claim 14, wherein the two fillers flier comprise a filler blend, and wherein ratio by weight of the filler blend to the polyolefin is 19 to 1, and wherein the ratio by weight of the plasticizer to the sum of the filler blend plus the polyolefin is 8 to 20.

16. A microporous separator to be used in batteries, comprising a sheet of microporous material made by the process of claim 8, formed into an envelope which closely and entirely surrounds all of the battery electrode in contact with an electrolyte within the batteries.

17. The microporous separator of claim 16, wherein the batteries comprise silver-zinc batteries.

18. The microporous separator of claim 17, wherein the microporous material is made by the method of claim 7.

19. A microporous battery separator, manufactured in accordance with the method of claim 1, stable in KOH, and comprising 4 to 6 weight percent polyolefin and 94 to 96 weight percent titanium dioxide blend, said polyolefin having a minimum molecular weight substantially of 3,000,000, and said titanium dioxide blend comprising a blend of ultra fine titanium dioxide having a maximum average particle size of 0.020 microns and pigment grade titanium dioxide having a particle size between 0.15 and 0.30 microns.

20. A battery separator according to claim 9, wherein said titanium dioxide blend is comprised substantially of 2.0 to 10.0 weight percent ultra fine titanium dioxide and 90 to 98 weight percent pigment grade titanium dioxide.

21. A battery separator according to claim 19, wherein said titanium dioxide blend is comprised substantially of 2 to 10 weight percent said ultra fine titanium dioxide having an average particle size of 0.017 microns, and 90 to 98 weight percent said pigment grade titanium dioxide having an average particle size of 0.18 microns.

22. A battery separator according to claim 19, wherein said titanium dioxide blend is comprised substantially of 10 to 90 weight percent said ultra fine titanium dioxide, and 10 to 90 weight percent said pigment grade titanium dioxide having an average particle size of 0.15 to 0.25 microns.

23. A battery separator according to claim 18, wherein said polyolefin is selected from a group consisting of polypropylene and polyethylene.

24. A battery separator as in claim 20 or 21, in which the average pore diameter is substantially in the range between 0.01 to 0.1 microns.

* * * * *